US010888813B2

(12) United States Patent
Choi et al.

(10) Patent No.: US 10,888,813 B2
(45) Date of Patent: Jan. 12, 2021

(54) WET TYPE DUST COLLECTOR USING ELECTROSPRAY AND VORTEX

(71) Applicant: KOREA INSTITUTE OF ENERGY RESEARCH, Daejeon-si (KR)

(72) Inventors: Jong Won Choi, Daejeon-si (KR); Dae Hun Chung, Seoul-si (KR); Jeong Geun Kim, Daejeon-si (KR); Young Min Woo, Daejeon-si (KR)

(73) Assignee: KOREA INSTITUTE OF ENERGY RESEARCH, Daejeon-si (KR)

( * ) Notice: Subject to any disclaimer, the term of this patent is extended or adjusted under 35 U.S.C. 154(b) by 282 days.

(21) Appl. No.: 15/973,087

(22) Filed: May 7, 2018

(65) Prior Publication Data

US 2019/0336904 A1    Nov. 7, 2019

(51) Int. Cl.

| | |
|---|---|
| *B01D 45/16* | (2006.01) |
| *B01D 47/06* | (2006.01) |
| *B01D 50/00* | (2006.01) |
| *B04C 9/00* | (2006.01) |
| *B05B 15/52* | (2018.01) |
| *B05B 5/03* | (2006.01) |
| *B05B 5/16* | (2006.01) |

(52) U.S. Cl.
CPC .......... *B01D 50/004* (2013.01); *B01D 45/16* (2013.01); *B01D 47/06* (2013.01); *B04C 9/00* (2013.01); *B05B 5/032* (2013.01); *B05B 5/16* (2013.01); *B05B 15/52* (2018.02); *B04C 2009/008* (2013.01)

(58) Field of Classification Search
CPC .. B01D 50/004; B01D 47/06; B04C 2009/008
See application file for complete search history.

(56) References Cited

U.S. PATENT DOCUMENTS

2010/0139492 A1* 6/2010 Fichman ................ B01D 45/16
96/319

FOREIGN PATENT DOCUMENTS

| JP | 8-52383 A | 2/1996 |
|---|---|---|
| JP | 10-141719 A | 5/1998 |

(Continued)

*Primary Examiner* — Cabrena Holecek
(74) *Attorney, Agent, or Firm* — Birch, Stewart, Kolasch & Birch, LLP

(57) ABSTRACT

The present invention relates to a wet type dust collector using electrospray and a vortex, the dust collector having a cyclonic structure and removing dust contained in exhaust gas by spraying fine droplets that are generated when high voltage is applied to the dust collector. More particularly, the present invention relates to a wet type dust collector using electrospray and a vortex, the dust collector including: a cylinder having an exhaust gas intake pipe for guiding exhaust gas containing granular pollutants at a predetermined position on the outer side, and forming an empty space; a hollow cone tapered downward, connected to the bottom of the cylinder at the top, and having a liquid discharge port at the bottom; a lid through which a hollow cylindrical gas discharge pipe is disposed to discharge gas with granular substances removed to the outside and, that is disposed on top of the cylinder; a positive (+) lead wire connected to the cylinder; and a negative (−) lead wire connected to the gas discharge pipe, in which a liquid container having one or more liquid spray ports is disposed on the gas discharge pipe.

4 Claims, 8 Drawing Sheets

(56) References Cited

FOREIGN PATENT DOCUMENTS

| | | | |
|---|---|---|---|
| JP | 2000-107634 A | 4/2000 | |
| JP | 2001-17885 A | 1/2001 | |
| JP | 2008-264738 A | 11/2008 | |
| JP | 2009-131795 A | 6/2009 | |
| KR | 10-0150707 B1 | 10/1996 | |
| KR | 10-2004-0103627 A | 12/2004 | |
| KR | 10-0623854 B1 | 9/2006 | |
| KR | 10-2007-0010623 A | 1/2007 | |
| KR | 10-1064498 B1 | 9/2011 | |
| KR | 10-1267878 B1 | 5/2013 | |
| KR | 20-0473001 Y1 | 6/2014 | |
| KR | 10-1420508 B1 | 8/2014 | |
| KR | 10-2015-0045068 A | 4/2015 | |
| KR | 102003744 B1 * | 11/2017 | ............... B03C 3/16 |
| KR | 20190055959 A * | 11/2017 | ............... B03C 3/16 |
| WO | WO2019107677 A1 * | 11/2017 | ............. B04C 5/185 |

* cited by examiner

WET TYPE DUST COLLECTOR USING ELECTROSPRAY AND VORTEX

BACKGROUND OF THE INVENTION

Field of the Invention

The present invention relates to a wet type dust collector and, more particularly, to a wet type dust collector using electrospray and a vortex, the dust collector having a cyclonic structure and removing dust contained in exhaust gas by spraying fine droplets that are generated when high voltage is applied to the dust collector.

Description of the Related Art

Exhaust gas that is discharged from a thermal, power plant or is generated when wastes are burned contains various air pollutants and dust having small granular sizes of the air pollutants exerts a harmful influence on the environment, including not only induction of respiratory illness in a human body, but suppression of growth of plants.

In order to control fine dust (Particulate Matter PM2.5) having a diameter smaller than 2.5 μm and known as being especially harmful among those air pollutants, the Environmental Protection Agency (EPA) and the European Union (EU), and Korea have enhanced environmental regulation on those substances by amending laws since 2013 and 2015, respectively.

Gravity dust collection, inertial dust collection, filter dust collection, scrubbing, and electrostatic precipitation are representative dust collection technologies. The gravity dust collection is a technology of naturally settling particles from moving air using the mass of the particles, and the inertial dust collection is a technology of collecting dust at a turning point using inertia by rapidly changing the flow direction of gas. These technologies are effective in removing relatively large particles, but hardly remove fine particles.

On the other hand, the scrubbing that removes particles by passing gas through a filter having fine holes and the electrostatic precipitation that removes dust by applying electric charge to dust by supplying electricity have been known as having relatively high dust collection efficiency. However, in case of the scrubbing, the fine holes are clogged with particles, so the capacity of processing exhaust gas is rapidly decreased. Thus, it is required to frequently replace filters, which is directly linked to an increase in costs for processing exhaust gas.

Further, a dry type of the electrostatic precipitation collects dust sequentially by applying electric charge to particles, bonding the particles to a collecting electrode, separating the particles from the collecting electrode, and removing the particles accumulated on the collecting electrode, but re-dispersion of dust and back corona etc. are generated by unstable corona discharge and particle's resistivity that is an electrical property of particles, whereby the dust collection efficiency is reduced. Further, there is a wet electrostatic precipitator that removing particles from an electrode with water, but it uses a large amount of water, causes a non-uniform film on the collecting electrode, and causes corrosion, which has been pointed out as a big problem.

Accordingly, it is strongly required to develop a new dust collector that is economical and has high removal efficiency in order to satisfy enhanced atmospheric environmental standard by effectively removing the air pollutants described above, particularly, substances having small particles.

CITATION LIST

Patent Literature

Patent Literature 1: Korean Patent No. 0150707
Patent Literature 2: Korean Patent Application Publication No. 2015-0045068

SUMMARY OF THE INVENTION

The present invention has been made in an effort to solve the problems, and an object of the present invention is to provide a wet type dust collector that can effectively remove even small particles contained in exhaust gas.

Another object of the present invention is to provide a wet type dust collector that can be easily operated, has a simple structure, and can reduce secondary pollutants.

In order to solve the problem, a wet type dust collector using electrospray and a vortex according to the present invention includes: a cylinder having an exhaust gas intake pipe for guiding exhaust gas containing granular pollutants at a predetermined position on the outer side, and forming an empty space; a hollow cone tapered downward, connected to the bottom of the cylinder at the top, and having a liquid discharge port at the bottom; a lid through which a hollow cylindrical gas discharge pipe is disposed to discharge gas with granular substances removed to the outside and that is disposed on top of the cylinder; a positive (+) lead wire connected to the cylinder; and a negative (−) lead wire connected to the gas discharge pipe, in which a liquid container having one or more liquid spray ports is fitted on the gas discharge pipe.

The lid may be made of an insulating material and the liquid container may have one or more liquid injection ports at predetermined positions.

Nozzles may be disposed in the spray ports to spray water to the inner side of the cylinder.

In order to solve the problem, a wet type dust collector using electrospray and a vortex according to the present invention includes: a cylinder having an exhaust gas intake pipe for guiding exhaust gas containing granular pollutants at a predetermined position on the outer side, and forming an empty space; a hollow cone tapered downward, connected to the bottom of the cylinder at the top, and having a liquid discharge port at the bottom; a lid through which a hollow cylindrical gas discharge pipe is disposed to discharge gas with granular substances removed to the outside and that is disposed on top of the cylinder; liquid injection pipes having one or more liquid spray ports and disposed around the cylindrical gas discharge pipe; a positive (+) lead wire connected to the cylinder; and a negative (−) lead wire connected to the gas discharge pipe.

Here, insulators are fitted on the outer surface of the liquid injection pipes to prevent electric connection between the cylinder and the liquid injection pipes.

In addition, the liquid injection pipes may be formed in a long cylindrical shape with one end open to supply liquid and the other end closed, and may have one or more liquid spray holes around them.

Further, nozzles may be disposed in the liquid spray ports to spray liquid to the inner side of the cylinder.

DETAILED DESCRIPTION OF THE PREFERRED EMBODIMENTS

Hereinafter, wet type dust collectors using electrospray and a vortex according to the present invention are described with reference to the accompanying drawings.

It should be understood that the terms "comprises," "comprising,", "have" and/or "having," when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It must be understood that the terms defined by the dictionary are identical with the meanings within the context of the related art, and they should not be ideally or excessively formally defined unless the context clearly dictates otherwise.

Figure 1:
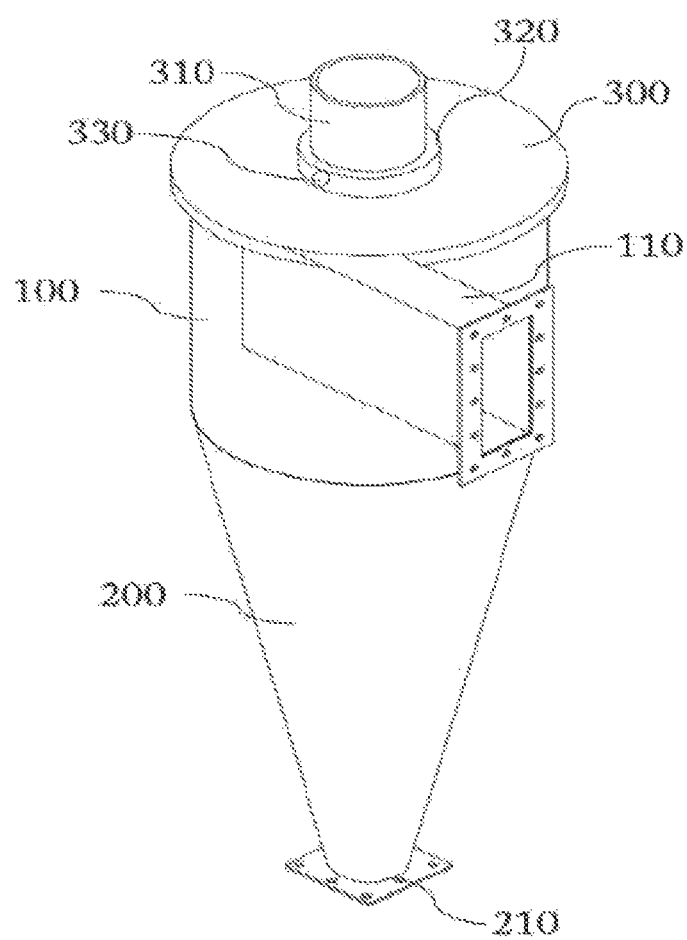
FIG. 1 is a schematic view of a wet type dust collector using electrospray and a vortex according to a first embodiment of the present invention.
Figure 2:
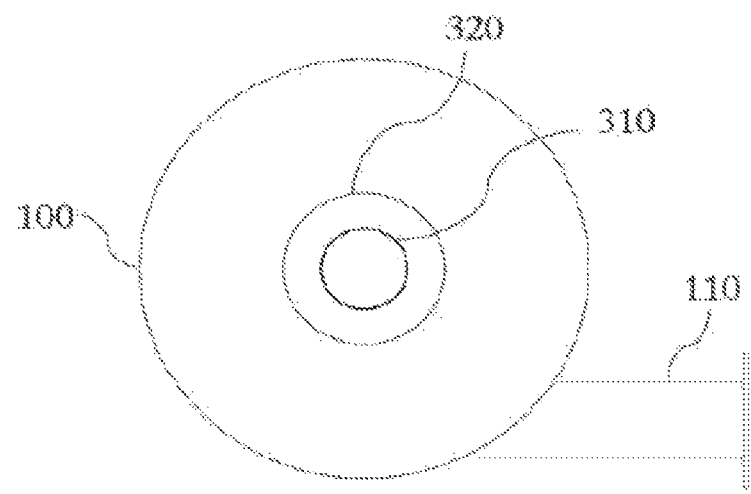
FIG. 2 is a plan view of the dust collector shown in FIG. 1.
Figure 3:
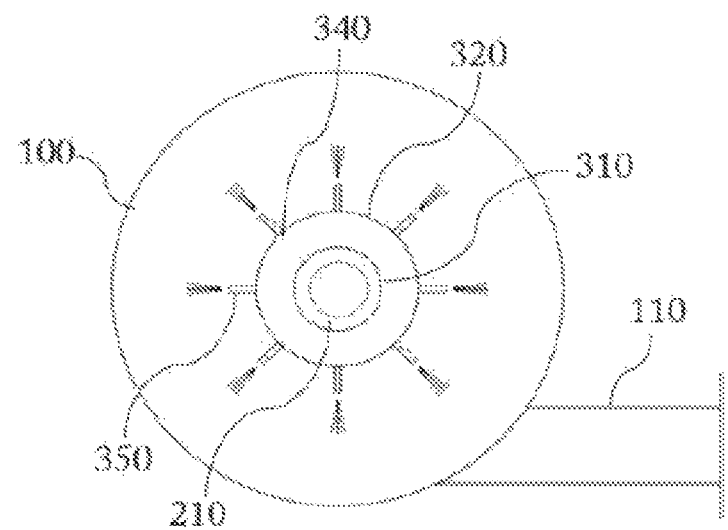
FIG. 3 is a cross-sectional view of a cylinder of the dust collector shown in FIG. 1.
Figure 4:
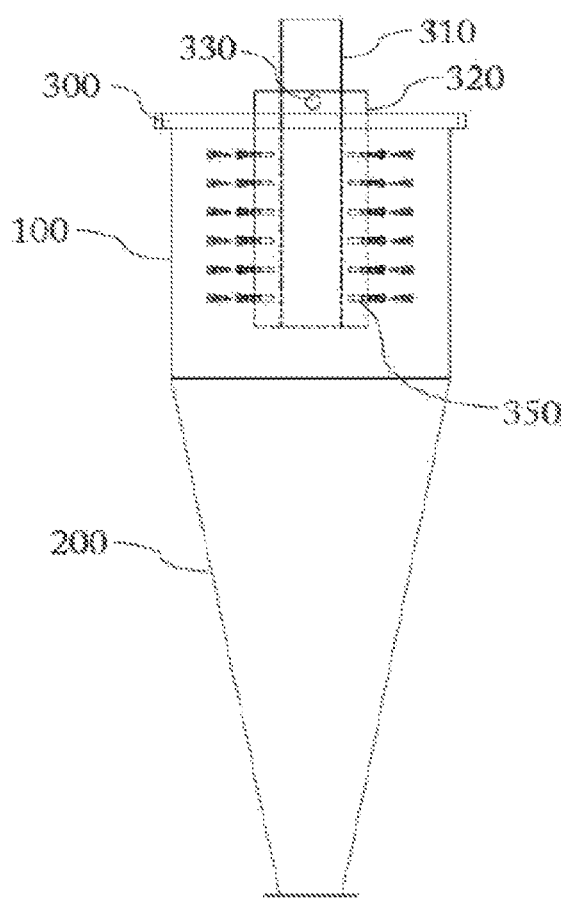
FIG. 4 is a vertical cross-sectional view of the dust collector shown in FIG. 1.

FIG. 1 is a schematic view of a wet type dust collector according to a first embodiment of the present invention, FIG. 2 is a plan view of the dust collector shown in FIG. 1, FIG. 3 is a cross-sectional view of a cylinder of the dust collector shown in FIG. 1, and FIG. 4 is a vertical cross-sectional view of the dust collector shown in FIG. 1.

As shown in FIGS. 1 to 4, a wet type dust collector according to a first embodiment of the present invention includes a cylinder 100, a cone 200, a lid 300, and a power supplier 400.

Describing the components in more detail, the cylinder 100 is a long cylindrical part having predetermined height and inner diameter. The cylinder 100 is made of a conductive material and has an exhaust gas intake pipe 110 having a predetermined cross-sectional area and disposed at a side from the central axis, so exhaust gas containing various granular pollutants is suctioned into the cylinder 100.

The cone 200 is an inverted conical part of which the cross-sectional area decreases as it goes down. The top of the cone 200 is connected to the bottom of the cylinder 100. A liquid discharge port 210 for discharging granular substances contained in exhaust gas with liquid to be described below is formed at the bottom of the cone 200.

The lid 300 made of an insulating material is attached to the top of the cylinder 100, except for the area through which a gas discharge pipe 310 and a liquid container 320 protrude to the outside, to be able to seal the cylinder 100.

The gas discharge pipe 310, which is a long hollow cylindrical part made of a conductive material, is disposed substantially at the center of the lid 300 and has one end protruding a predetermined height upward from the lid 300 and the other end positioned at a predetermined depth in the cylinder 100.

Further, the liquid container 320 for spraying ionized liquid to the inner space of the cylinder 100 is disposed at a predetermined position of the lid 300. In more detail, the liquid container 320 has a substantially U-shape of which an inner side is open to bring liquid therein in direct contact with the outer side of the gas discharge pipe 310 and, the outer side, the bottom and the top are closed except for a liquid injection port 330 and liquid spray ports 340 to be described below. Further, the liquid container 320 has one end protruding a predetermined height upward from the lid 300 and the other end positioned at a predetermined depth in the cylinder 100.

The liquid injection port 330 may be formed at one or more predetermined positions at the portion protruding out of the lid 300. Further, a liquid supply pump (not shown) may be connected to a tube (not shown) that communicates with the liquid injection port 330 to intermittently or regularly supply liquid into the liquid container 320.

The liquid spray ports 340 are holes in which nozzles 350 are fitted to spray the liquid in the liquid container 320 toward the inner side of the cylinder 100. The liquid can be sprayed by the pressure from the liquid supply pump (not shown) connected to the liquid injection port 330.

Obviously, although it is exemplified that the nozzles 350 are fitted in the spray ports 340, liquid can be directly sprayed through the liquid spray ports 340 without the nozzles 350.

The liquid is not specifically limited as long as it can be ionized, but is preferably pure water or ionic liquid that is dissolved well in water.

In addition, the nozzle tips of the spray ports may be any one of cylindrical, triangular, rectangular, polygonal, or amorphous nozzle tips and the diameter of the nozzles may be in the range of 0.02~2 mm.

A positive (+) lead wire 410 electrically connected to the power supplier 400 is connected to the cylinder 100 and a negative (−) lead wire 420 is connected to the gas discharge pipe 310, so when high voltage is applied, fine droplets are sprayed toward the inner side of the cylinder 100 through the nozzles 350.

The principle of electrospray using high voltage, as described above, is described. When positive (+) and negative (−) high voltage is applied with conductive liquid passing through a nozzle, ions in the nozzle and the liquid are moved to the surface of the liquid by attraction and repulsion. When coulomb repulsion increases to be over the surface tension, fine droplets are sprayed. Further, when low voltage is applied to an electrode, the electric force acting on the curved surface of the liquid and repulsion of positive ions are smaller than the surface tension of the liquid, so droplets are not sprayed. However, when the voltage is increased, the electric force acting on the curved surface of the liquid and repulsion of positive ions are increased over the surface tension of the liquid, droplets are sprayed from a capillary tip.

Here, the high voltage is not specifically limited as long as electrospray is possible and dielectric breakdown of an insulating material is possible, but it may be preferably 10 kV to 50 kV.

According to dust collectors using a conventional liquid spray method, it is difficult to collect small particles since the sizes of sprayed droplets are big and liquid is excessively used, so the costs for secondary processing are unavoidably increased.

However, according to the present invention, since droplets are produced through electrospray, the diameters of droplets are very small. Particularly, the produced droplets have the same polarities as the polarities applied to the nozzles and a large quantity of electric charge, so cohesion of the droplets is not generated. Accordingly, the initial diameters can be maintained for a long time, so it is possible to collect fine particles having small granular sizes of 0.1 μm or smaller.

Figure 5:
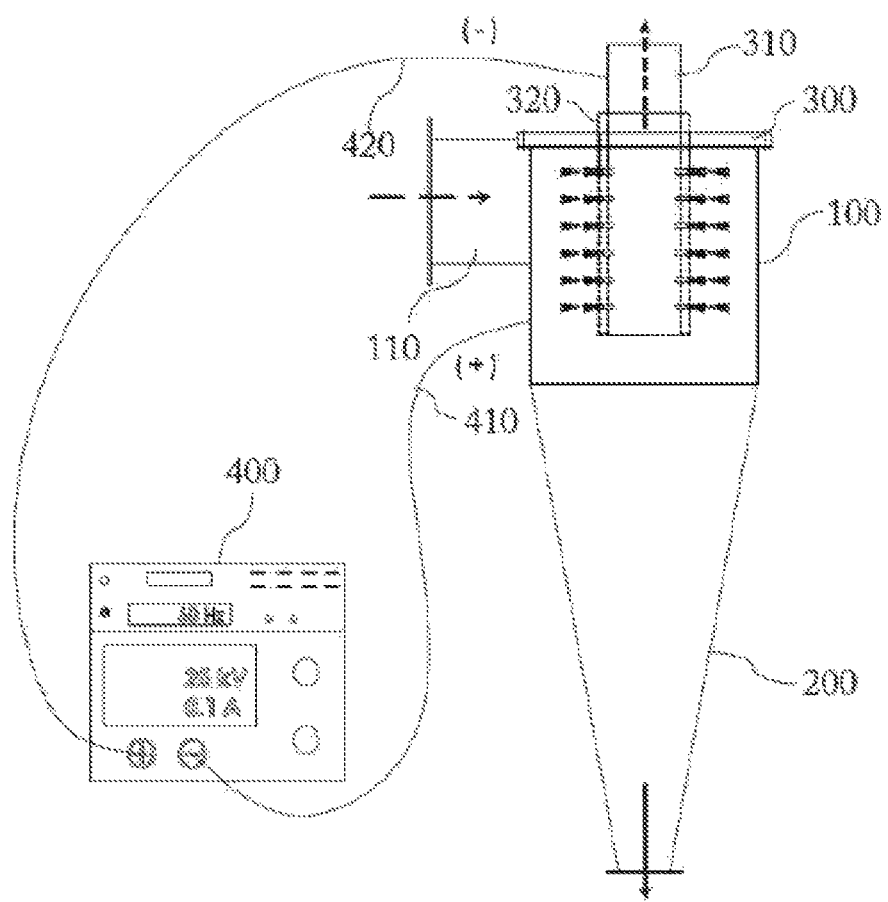
FIG. 5 is a schematic view showing the operation status of the dust collector shown in FIG. 1.

The operation status of the dust collector according to the first embodiment of the present invention is described hereafter with reference to FIG. 5.

First, the positive (+) lead wire 410 and the negative (−) lead wire 420 are connected to the cylinder 100 and the gas discharge pipe 310, respectively, liquid is supplied into the liquid injection port 330 of the liquid container 320 and high voltage is applied, thereby generating fine droplets in the cylinder 100.

With or after this operation, when exhaust gas is suctioned through the side intake pipe 110 of the cylinder 100, granular substances in the exhaust gas are collected by the fine droplets and discharged through the liquid discharge port 210 at the bottom of the cone 200 and the gas with the granular substances removed is discharged to the outside through the gas discharge pipe 310 disposed through the center of the lid 300.

Figure 6:
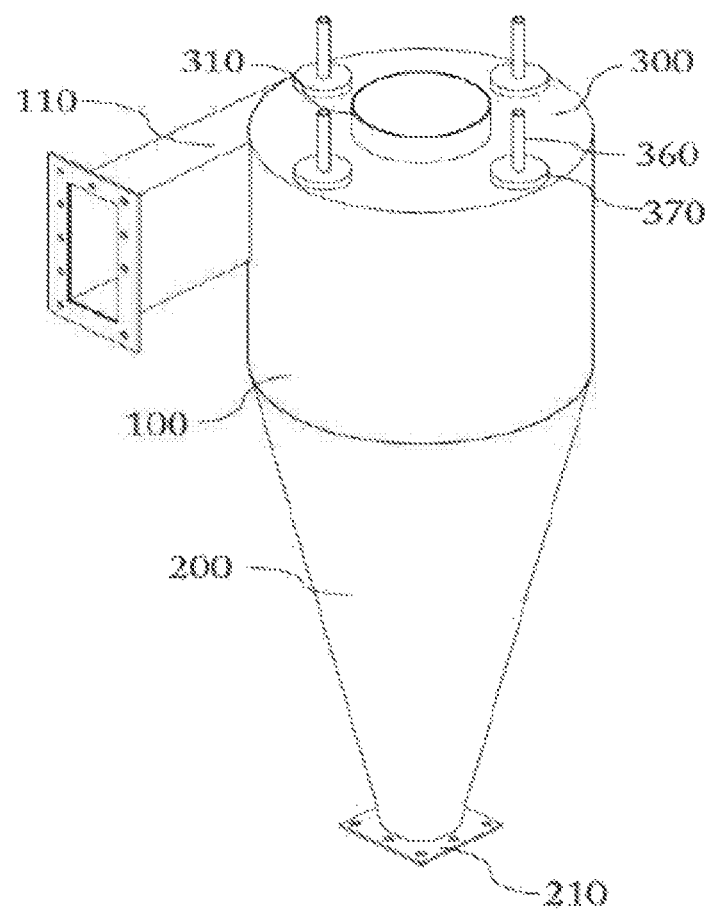
FIG. 6 is a schematic view of a wet type dust collector using electrospray and a vortex according to a second embodiment of the preset invention.
Figure 7:
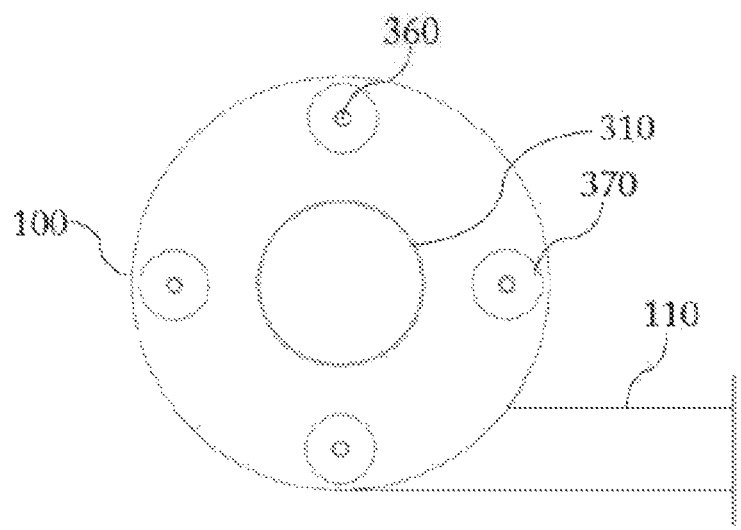
FIG. 7 is a plan view of the dust collector shown in FIG. 6.
Figure 8:
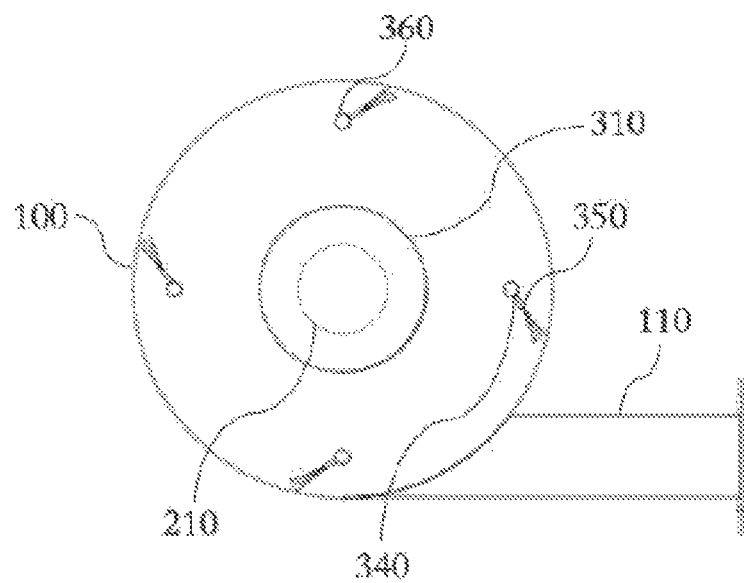
FIG. 8 is a cross-sectional view of a cylinder of the dust collector shown in FIG. 6.

A wet type dust collector using electrospray and a vortex according to a second embodiment of the present invention is described hereafter with reference to FIGS. 6 to 8.

Figure 9:
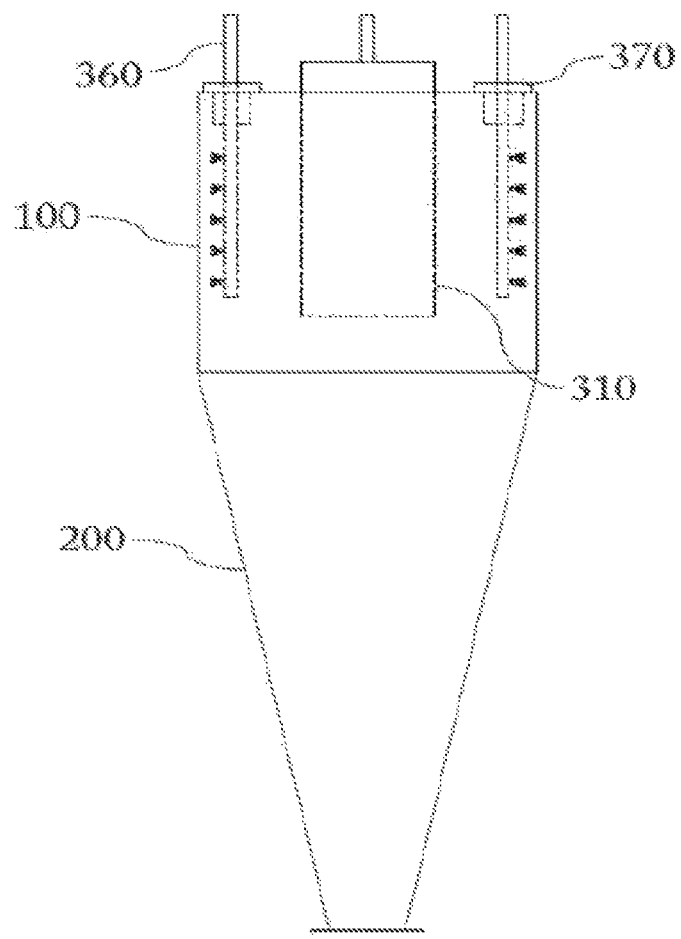
FIG. 9 is a vertical cross-sectional view of the dust collector shown in FIG. 6.

FIG. 6 is a schematic view of a wet type dust collector using electrospray and a vortex according to a first embodiment of the present invention, FIG. 7 is a plan view of the dust collector shown in FIG. 6, FIG. 8 is a cross-sectional view of a cylindrical portion of the dust collector shown in FIG. 6, and FIG. 9 is a vertical cross-sectional view of the dust collector shown in FIG. 6.

As shown in FIGS. 6 to 9, a wet type dust collector according to a second embodiment of the present invention includes a cylinder 100, a cone 200, a lid 300, and a power supplier 400.

The cylinder 100 and the cone 200 are the same as those in the first embodiment, so they are not described in detail.

The lid 300 is attached to the top of the cylinder 100, except for the area through which a gas discharge pipe 310 and insulators 370 to be described below protrude to the outside, to be able to seal the cylinder 100.

The gas discharge pipe 310, which is a long hollow cylindrical part similar to the first embodiment, is disposed substantially at the center of the lid 300, and has one end protruding a predetermined height upward from the lid 300 and the other end positioned at a predetermined depth in the cylinder 100.

The lid 300 has one or more liquid injection pipes 360 for spraying ionized liquid to the inner space of the cylinder 100 at predetermined positions. In detail, the liquid injection pipes 360 are made of a conductive material in a shape of a long narrow cylindrical pipe with one end open and protruding a predetermined height upward from the lid 300 and the other end closed and positioned at a predetermined depth in the cylinder 100.

One or more liquid spray ports 340 are formed at each of the liquid injection pipes 360, and the outer sides of the portions being in contact with the lid 300 are covered with the insulators 370 having a predetermined thickness to prevent electric connection with the lid 300.

Here, it is preferable to have the liquid spray ports 340 and nozzles 350 in the liquid injection pipes 360 inclined at a predetermined angle with respect to the inner side of the cylinder 100 so that exhaust gas suctioned through an intake pipe 110 at a side of the cylinder 100 can maintain a vortex.

The liquid injection pipes 360 protruding a predetermined height upward from the lid 300 may be connected to a tube (not shown) and a liquid supply pump (not shown) to intermittently or regularly supply liquid.

The liquid spray ports 340 are holes in which nozzles 350 are fitted to spray the liquid supplied to the liquid injection pipes 360 into the cylinder 100, so the liquid can be sprayed by the pressure from the liquid supply pump (not shown) connected to inlets of the liquid injection pipes 360.

Obviously, although it is exemplified that the nozzles 350 are fitted in the spray ports 340, liquid can be directly sprayed through the liquid spray ports 340 without the nozzles 350.

A positive (+) lead wire 410 electrically connected to the power supplier 400 is connected to the cylinder 100 and a negative (−) lead wire 420 is connected to the liquid injection pipes 360, so when high voltage is applied, fine droplets are sprayed to the inner space of the cylinder 100 through the nozzles 350.

The principle of electrospray using high voltage is the same as that described above.

Figure 10:
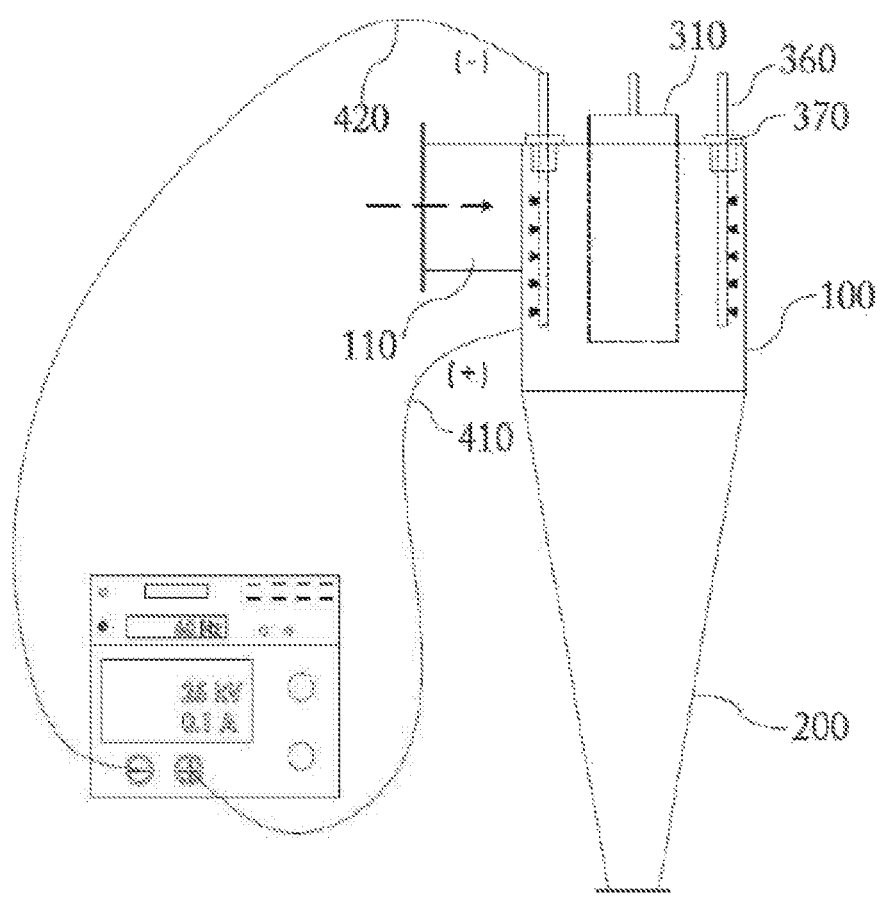
FIG. 10 is a schematic view showing the operation status of the dust collector shown in FIG. 6.

The operation status of the dust collector according to the second embodiment of the present invention is described hereafter with reference to FIG. 10.

First, the positive (+) lead wire 410 and the negative (−) lead wire 420 are connected to the cylinder 100 and the liquid injection pipes 360, respectively, liquid is supplied into the liquid injection pipes 360, and high voltage is applied, thereby generating fine droplets in the cylinder 100.

With or after this operation, when exhaust gas is suctioned through the side intake pipe 110 of the cylinder 100, granular substances in the exhaust gas are collected by the fine droplets and discharged through the liquid discharge port 210 at the bottom of the cone 200 and the gas with the granular substances removed is discharged to the outside through the gas discharge pipe 310 disposed through the center of the lid 300.

According to the wet type dust collector using electrospray and a vortex of the present invention, since fine droplets are produced by applying high voltage and the fine droplets and exhaust gas are brought in contact with each other, it is possible to improve the efficiency of removing particles having small granular sizes.

Further, since the wet type dust collector of the present invention has a cyclone structure that removes particles using centrifugal force generated by a vortex, the configuration of the dust collector is simple and it is possible expect removal effect by specific weight and collision of particles.

Further, since the wet type dust collector of the present invention can produce fine droplets, it is possible to minimize production of waste liquid containing particles, so it is possible to reduce the costs for secondary processing.

Although specific characteristics of the present invention were described above, the detailed description is just a preferable embodiment to those skilled in the art and the present invention is not limited thereto. Further, it is apparent to those skilled in the art that the present invention may be changed and modified in various ways without departing from the scope and spirit of the present invention and, the changes and modifications are included in the accompanying claims.

What is claimed is:

1. A wet type dust collector using an electrospray and a vortex, the dust collector comprising:
   a cylinder having an exhaust gas intake pipe to guide an exhaust gas containing granular pollutants from an outside of the dust collector, and having an empty space inside;
   a hollow cone tapered downward, connected to a bottom of the cylinder at a top of the hollow cone, and having a liquid discharge port at a bottom of the hollow cone;
   a lid through which a hollow cylindrical gas discharge pipe is disposed to discharge the gas to the outside of the dust collector and that is disposed on a top of the cylinder;
   a plurality of liquid injection pipes having liquid spray ports and disposed through the lid, the plurality of liquid injection pipes being spaced apart from one another and spaced apart from the cylindrical gas discharge pipe;
   a positive (+) lead wire connected to the cylinder;
   a negative (−) lead wire connected to the liquid injection pipes,
   wherein the liquid injection pipes are formed in a long cylindrical shape with one end open to supply a liquid therein, and
   wherein the liquid spray ports of the liquid injection pipes are inclined with respect to an inside of the cylinder.

2. The dust collector of claim 1, further comprising insulators fitted on an outer surface of each of the liquid injection pipes to prevent an electric connection between the cylinder and the liquid injection pipes.

3. The dust collector of claim 1, wherein the liquid injection pipes further comprise nozzles disposed in the liquid spray ports to spray the liquid into the cylinder.

4. The dust collector of claim 3, wherein the nozzles are inclined with respect to the inside of the cylinder.

* * * * *